United States Patent [19]

Brauer

[11] Patent Number: 5,672,640
[45] Date of Patent: Sep. 30, 1997

[54] POLYPROPYLENE COMPATIBLE GREASE COMPOSITIONS FOR OPTICAL FIBER CABLE

[75] Inventor: Melvin Brauer, E. Brunswick, N.J.

[73] Assignee: Caschem, Inc., Bayonne, N.J.

[21] Appl. No.: 500,650

[22] Filed: Jul. 12, 1995

[51] Int. Cl.$^6$ ............... C08K 3/34; C08K 5/11; C10M 113/10; G02B 6/44

[52] U.S. Cl. ............... 523/173; 524/445; 524/492; 524/493; 524/310; 428/380; 428/383; 385/100; 252/28; 174/110 R

[58] Field of Search ............... 523/173; 252/28; 524/445, 492, 493, 310; 385/100; 174/110 R; 428/380, 383

[56] References Cited

U.S. PATENT DOCUMENTS

| | | | |
|---|---|---|---|
| 2,966,472 | 12/1960 | Fiel | 528/74.5 |
| 3,047,520 | 7/1962 | Fiel | 524/773 |
| 4,596,743 | 6/1986 | Brauer et al. | 428/380 |
| 4,666,968 | 5/1987 | Downey et al. | 524/296 |
| 4,701,016 | 10/1987 | Gartside, III et al. | 385/100 |
| 4,812,533 | 3/1989 | Simone et al. | 525/437 |
| 4,867,526 | 9/1989 | Arroyo | 385/107 |
| 5,082,719 | 1/1992 | Arroyo | 428/219 |
| 5,147,921 | 9/1992 | Mallo | 524/493 |
| 5,163,115 | 11/1992 | Sheu | 385/100 |
| 5,348,669 | 9/1994 | Brauer et al. | 252/28 |

OTHER PUBLICATIONS

Technical Bulletin, Castor Oil & Derivatives, CasChem, Inc., 1995.

*Primary Examiner*—Paul R. Michl
*Assistant Examiner*—John J. Guarriello
*Attorney, Agent, or Firm*—Pennie & Edmonds LLP

[57] ABSTRACT

A grease composition for use as a cable filling material which contains about 25 to 75 parts by weight of castor oil or a ricinoleate polyol, about 13 to 71 parts by weight of a hydroxy-terminated polymer of polymerized castor oil or the reaction product of a polyisocyanate compound and castor oil or a ricinoleate polyol, and about 4 to 12 parts by weight of colloidal particles such as silica, clay or mixtures thereof. Optionally, an antioxidant component can be added to impart high temperature resistance, a bleed inhibitor, typically of a rubber component, can be added to improve bleed resistance, a water blocking agent of a superabsorbent compound can be added to reduce water transmission, microspheres can be added to reduce the weight of the formulation, and/or conventional additives such as fungicides, bacteriocides etc. can be included. The invention also relates to an article of manufacture such as a cable having a sheath surrounding a plurality of optical fibers therein, with one of the grease compositions of the invention located therein.

15 Claims, No Drawings

POLYPROPYLENE COMPATIBLE GREASE COMPOSITIONS FOR OPTICAL FIBER CABLE

FIELD OF THE INVENTION

The present invention relates to a colloidal particle filled polyol base component grease composition and to articles such as sheathed communication cables, especially those containing optical fiber bundles, which include this grease composition therein.

BACKGROUND OF THE INVENTION

A grease typically is a solid or semi-liquid substance which includes a thickening or gelling agent in a liquid carrier. Almost any oil having lubricating properties may be used with a suitable gelling agent to make a grease. Petroleum oils, fatty oils such as castor oil, polyalkylene glycols, synthetic diesters, silicones, fluorocarbons and polyphenyl ethers are all found in commercial lubricating greases. (See, e.g. Braithwaite, "Lubrication and Lubricants," Elsevier Publishing Co., 1967, pages 181–183 and 223–228). The gelling agent frequently used in greases include fatty acid soaps, clays, silica, organic dyes, amides, and urea derivatives. The gelling agent forms a network structure in which the carrier is held by capillary forces.

When a low stress is applied through a sample of grease, the material acts substantially like a solid. If a stress above a critical value is supplied, the material flows and viscosity decreases rapidly. This decrease in viscosity is largely reversible since it is typically caused by the rupture of network junctions between filler particles, and these junctions can reform following the removal of the source of the stress.

A desirable property of the grease is the absence of syneresis, i.e., its ability to maintain uniform consistency. Generally, syneresis is controlled by assuring dispersion of an adequate amount of the gelling agent throughout the composition.

Grease compositions have been used as cable filling material is both conventional (electrical) communications as well as for optical fiber cables. U.S. Pat. No. 4,701,016 discloses a grease compositions comprising an oil, a gelling agent such as colloidal particles of silica or clay, and optionally a bleed inhibitor. The oils which are disclosed as being useful in the compositions of the patent include certain naphthenic or paraffinic oils having certain specific gravities and properties, polybutene oils of similar specific properties, triglyceride based vegetable oils, polypropylene oil, chlorinated paraffin oils, and polymerized esters. The colloidal particle filler material preferably comprises silica particles such as fumed silica or precipitated silica. Preferred bleed inhibitors include styrene-rubber, styrene-rubber-styrene, or other block polymers, and/or semi liquid rubbers such as high viscosity polyisobutylene. Other ingredients such as thermal oxidative stabilizers may optionally be present.

One disadvantage of the compositions of U.S. Pat. No. 4,701,016 is that relatively large amounts of silica must be included to meet the appropriate service requirements for the grease. Thus, relatively stiff greases are obtained which are not entirely suitable for fiber optic cables. In particular, such stiff greases will affect attenuation (microbending) of the fiber optic cable at relatively low temperatures (i.e., below about 50° F.). Furthermore, if the amount of silica is reduced to lower the viscosity of the grease, the shear characteristics of the formulation are reduced to a value which is less than desirable. Moreover, such a reduction in silica often results in syneresis.

U.S. Pat. No. 5,348,669 discloses polyol-containing grease compositions that are capable of providing an optimum balance of viscosity and shearing characteristics such that the compositions are entirely suitable for use with fiber optic cables even at lower temperatures. In addition, these formulations provide properties which are capable of passing the appropriate drip tests, paper bleeding tests, and syneresis requirements for such cable filling greases. U.S. Pat. No. 5,348,669 relates to a grease composition for use as a cable filling material, comprising between about 75 and 95 parts by weight of a base component of a polyol or ester having a molecular weight of at least about 3,000 and between about 2 and 20 parts by weight of colloidal particles. While these grease compositions function quite well as optical cable filling and flooding compounds, they are more costly to produce than mineral oil containing greases.

In addition, U.S. Patents such as U.S. Pat. Nos. 4,867,526, 5,082,719 and 5,163,115 disclose various cable configurations which include provisions for preventing water migration through the cable, such provisions including a superabsorbent polymer or a tape which is impregnated with a superabsorbent material. These configurations are also more costly to produce and/or install than mineral oil containing grease compositions.

Due to the relatively long lengths of cable that are installed, certain cable components are being made from conventional plastic components such as polypropylene in an attempt to reduce the cost of the cable as well as obtain multiple supply sources for such components. This presents a problem to the cable grease supplier in that many grease compositions are not compatible with materials such as polypropylene and can cause deterioration of those materials and consequent loss of properties.

To remedy this problem, certain prior art cable filling and flooding compounds are either formulated with more expensive components which are compatible with polypropylene, or the cables are configured so that incompatible compounds do not come in contact with the polypropylene components. It would be preferable to have polypropylene compatible filling and flooding compounds which are relatively low cost in order to provide economic benefits to cable manufacturers and purchasers.

Thus, there is a need for high performance, low cost cable filling and flooding compounds which are compatible with polypropylene cable components. The present invention provides one solution to these problems.

SUMMARY OF THE INVENTION

The present invention relates to a grease composition for use as a filling or flooding material for communications cable and in particular for optical fiber cable. This grease composition contains about 25 to 75 parts by weight of an oil component comprising castor oil or a ricinoleate polyol; about 13 to 71 parts by weight of a hydroxy-terminated polymer of (A) polymerized castor oil or (B) the reaction product of a polyisocyanate compound and castor oil or a ricinoleate polyol; and about 4 to 12 parts by weight of colloidal particles which are present to impart a gel structure to the composition when mixed therewith.

The preferred colloidal particles are hydrophobic fumed silica, precipitated silica, clay, or mixtures thereof and are present in an amount of about 5 to 10 parts by weight. The preferred oil is castor oil and is present in an amount of about 40 to 70 parts by weight and the preferred hydroxy-terminated polymer is the reaction product of a polyisocyanate compound and castor oil having a hydroxyl value of at least 70 and a viscosity of at least 26 stokes at 25° C. and is present in an amount of about 20 to 50 parts by weight. Preferably, the oil is present in an amount of about 50 to 60 parts by weight, the hydroxy-terminated polymer is present in an amount of about 30 to 40 parts by weight, and the colloidal particles are present in an amount of about 6 to 8 parts by weight.

The composition may include a bleed inhibitor in an amount of up to about 5 parts by weight, an antioxidant in an amount of between about 0.1 and 2 parts by weight, a water blocking agent in an amount of up to about 10 parts by weight, or hollow microspheres in an amount of up to about 10 parts by weight. The composition may also include a biocide, preferably a fungicide, in an amount of up to about 3 parts by weight order to protect the composition against deterioration. Further details on these and other additives are further described below.

The invention also relates to a coaxial cable comprising a plurality of optical fibers, and a sheath surrounding the fiber and filled with one of the grease compositions described above.

DETAILED DESCRIPTION OF THE INVENTION

Polyol containing grease compositions of the present invention are ideally suited for use in connection with the filling of optical fiber cable, such as those disclosed in U.S. Pat. Nos. 4,701,016, 4,645,298, 4,711,523, 4,744,631, and 5,348,669. To the extent necessary to understand the structure of such cables, these patents are expressly incorporated herein by reference thereto.

The polyols

The polyols which are useful in this invention include castor oil or other hydroxy-terminated polymers derived from castor oil, ricinoleate diols or other ricinoleate polyols. Castor oil is a naturally occurring triglyceride of ricinoleic acid. Castor oil is actually a mixture of mono-, di-, and triglycerides and has an average hydroxyl functionality of approximately 2.7. Other ricinoleate polyols include ricinoleate diols and glycol, polyglycol and other polyhydric alcohol mono-, di-, and polyesters of ricinoleic acid. The ricinoleate polyols of U.S. Pat. No. 4,812,533 are useful, and the content of that patent is expressly incorporated herein by reference thereto. Castor oil is the most preferred due to its relatively low cost and ready availability.

The ricinoleic acid polyol esters can be made by methods well known in the art, e.g., by direct esterification of ricinoleic acid with alcohols such as ethylene glycol, glycerine, propylene glycol, hexylene, glycol, diethylene glycol, dipropylene glycol, hexamethylene glycol, polyethylene and polypropylene glycols, sucrose or sorbitol. Specific ricinoleate ester compounds include ethylene glycol mono- and diricinoleates, propyl mono- and diricinoleates, penta erythritol mono-, di-, tri-, tetra- and pentaricinoleates, glycerol ricinoleate, 1,4-cyclohexane dimethanol mono- and diricinoleates, butanediol diricinoleate, neopentylglycol mono- and diricinoleates, and mono- or diricinoleates of N,N-bis (2-hydroxy propyl) aniline or N,N,N,'N'- tetrakis (2-hydroxy propyl) ethylene diamine.

Hydroxy-terminated Polymers

Suitable polymers for this component include polymerized castor oil and the reaction product of a polyisocyanate compound with castor oil or a ricinoleate diol or polyol. Castor oil which is polymerized to a molecular weight of at least about 1000 is acceptable, but commercial compounds such as the VORITE series of polymerized oils which are available from CasChem, Inc. are preferred. The VORITE polymers are made by reacting castor oil with a polyisocyanate compound to produce an oil-urethane adduct that has a hydroxyl number of at least 70 and a molecular weight of at least about 9,000. Typically, hydroxyl numbers between 70 and 130 and molecular weights of between 2,000 and 9,000 are preferred.

Suitable isocyanate compounds include aliphatic polyisocyanates, cycloaliphatic polyisocyanates or aromatic polyisocyanates. Typical of such compounds are 3-isocyanatomethyl-3,5,5-trimethyl-cyclohexyl isocyanate (IPDI), toluene diisocyanate (TDI), 4,4-diphenylmethane diisocyanate (MDI), polymethylene polyphenylisocyanate, 1,5-napthalene diisocyanate, phenylene diisocyanate, biuret of hexamethylene diisocyanate, 2,2,4-trimethyl hexamethylene diisocyanate and combinations thereof. TDI is preferred. As noted above the stoichiometry of the reaction should be such that the resulting adduct has hydroxyl functionality. One of ordinary skill in the art would know how to react the components to obtain the desired adducts.

Ricinoleate polyols can also be reacted with polyisocyanate compounds in essentially the same manner as castor oil. Suitable ricinoleate polyols include those which are disclosed in U.S. patent 4,812,533 and which are described above as useful for the polyol component.

Fillers

Among the colloidal particles which are useful as fillers in the practice of the invention are colloidal silica, either hydrophilic or hydrophobic, preferably a hydrophobic fumed silica having a BET surface area between about 50 and about 40 m$^2$/gm. An example of a hydrophobic fumed silica useful in the practice of the invention is a polydimethylsiloxane-coated fumed silica having a BET surface area of about 80–120 m$^2$/gm, containing about 5% by weight carbon, available from the Cabot Corporation of Tuscola, Ill., under the trade designation Cab-O-Sil TS 720. An exemplary hydrophilic colloidal material is fumed silica with a BET surface area of about 175–225 m$^2$/gm, nominal particle size 0.012 μm, specific gravity 2.2, available from the Cabot Corporation under the trade designation Cab-O-Sil M-5. Mixtures of these materials may also be used. Other silicas such as Degussa US202 can be used.

Other colloidal fillers useful in the practice of the invention are precipitated silicas and clays such as bentonites, with or without surface treatment. Partially soluble polymers such as polyaramids and polyamides can also be used, either alone or in combination with one or more of the other fillers.

The following optional ingredients can also be included in the inventive compositions, if desired.

Antioxidants

As noted above, an antioxidant may be used to impart enhanced high temperature stability to the grease. Preferred antioxidants include Vanderbilt Chemical V854, a zinc, sulfur and phenolic compound antioxidant, Vanderbilt Chemical PLX959, a blend of amine and phenolic compounds, and Ciba Geigy L06 or L150, which are amine-based antioxidants. These additives are used in an amount of about 0.1 to 2 and preferably at about 0.5 to 1 parts by weight.

Also useful is Ciba-Geigy Irganox 245, a sterically hindered phenolic compound in the form of a white crystalline powder having the empirical formula $C_{34}H_{50}O_8$, This compound is also known as triethylene glycol bis [3-(3'-tert-butyl-4'-hydroxy-5'-methylphenyl) propionate] or ethylene bis (oxyethylene) bis (3-tert-butyl-4-hydroxy-5-methyl hydro cinnamate). other bis hindered phenol rings connected by a polyether linkage should provide comparable results, but the Irganox 245 is preferred due to its ready commercial availability.

To determine whether or not a particular antioxidant is suitable for use in the present invention, a Belcore oxygen inhibition test ("OIT") may be conducted. A sample of the grease is put in a calorimeter in a boat under nitrogen pressure and is conditioned at 190°C. Thereafter, pure oxygen is pumped into the calorimeter and changes in the grease are measured. In order to provide a suitable grease, the rest of the material must be able to have an oxidative induction time of at least about 20 and preferably 30 minutes at 190° C. with a pure oxygen environment. The use of 0.75% by weight of V854 or PLX 959 in the grease formulations of the present invention allows the grease to have an oxidative induction time of approximately 50 minutes or more in this test. The Examples illustrate the preferred OIT values for certain grease compositions.

Bleed Inhibitors

The useful bleed inhibitors include polyurethane elastomers, polyester elastomers, butadiene-acrylonitriles, polyacrylates or copolymers of acrylates, or rubber block copolymers and are present in an amount of up to 5 and preferably between about 1 and 4 parts by weight. These materials are well known to one of ordinary skill in the art, and they can be used alone or in various combinations.

Microspheres

Microspheres can also be added to the inventive grease formulations in an amount of up to about 10 and preferably between about 1 and 5 parts by weight. Generally, microspheres formed from any one of a wide variety of materials such as, e.g., thermoplastic resins, thermosetting resins, ceramics, glass and sintered metals, are suitable. The microspheres range in diameter between about 1–200 and preferably 50–130 microns. They are dispersed relatively uniformly throughout the grease by mixing and reduce the weight and cost of the overall composition. Several acceptable types of thermoplastic microspheres for use with the present invention are marketed, for example, by EXPANCEL and Pierce & Stevens. Such microspheres may further include a coating thereon. Pierce & Stevens markets microspheres under the trade name DUALITE, which includes any one of a variety of coatings thereupon, such as talc, calcium carbonate, zinc oxide, titanium dioxide, mica, calcium sulfate, barium sulfate, antimony oxide, clay, silica, and aluminum trihydrate. U.S. Pat. No. 3,615,972 to Morehouse, the disclosure of which is incorporated herein by reference, discloses a number of techniques used in manufacturing microspheres of the type which is also suitable for use in the present invention.

Superabsorbents

Superabsorbents can also be included in an amount of up to about 10 and preferably between about 1 and 5 parts by weight of the composition. Superabsorbents are hydrophilic materials which can absorb and retain water under pressure without dissolution in the fluid being absorbed. See U.S. Pat. Ser. No. 4,867,526 and the materials disclosed therein, which document is incorporated by reference herein. Properties such as enzyme stability, biodegradability, absorbent capacity and rate of uptake are used to characterize a superabsorbent material.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes—polyacrylic acid superabsorbents, polymaleic anhydride vinyl monomer superabsorbents and polyvinyl alcohol superabsorbents. Of these, the polyacrylic acid and polyacrylonitrile-based superabsorbents are most common. As with cellulosic-graft copolymer superabsorbents, the capacity of synthetic superabsorbents decreases with increasing salinity although more recent products have been formulated to perform in the presence of salts. The disclosure of such salt tolerant superabsorbent materials can be found in U.S. Pat. No. 5,163,115, the content of which is also expressly incorporated herein by reference thereto.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time required to absorb and the strength of the gel formed. Generally, the higher the cross-linking density, the stronger is the gel which is formed. The time to reach absorbent capacity decreases as the cross-linking density increases, and the absorbent capacity decreases.

The compositions of the invention may also include other additives such as biocides and fungicides in an amount of from 0.01 to 3 parts by weight. A preferred fungicide is TK100 which is made by Calgon Corporation, and which is generally used in an amount of between about 0.05 and 0.25 parts by weight.

Placing the Compositions in Optical Fiber Cables

By following the combination of ingredients disclosed above, the grease of the present invention is characterized as being non-dripping with high penetration and a low yield stress. The high penetration capabilities as a grease allows a better fluidity, that is, lower viscosities may be used so that the cable may be more easily filled with the grease. Furthermore, the present invention provides advantages over prior art formulations. The processing properties as noted above are exceptional in that the material can thin out as much as possible under heat and shear for easy cable filling. This is evident by yield stresses of as low as about 10 to 30 for the filling compositions of the invention, and from about 50 to 150 for flooding compositions. Thus, the grease of the invention fills the cable more easily and faster and thus avoids microbending difficulties which can cause attenuation in fiber optic cable.

When introducing the grease into the fiber optic cable as a filling compound, it is important to achieve as low a viscosity as possible so that the fibers would not be moved. This is achieved by introducing the grease under high shear into the cable. The grease composition is retained in a reservoir or drum upon which a drum pump of the piston type is attached. This pump causes low shear and movement of the grease out of the drum and into a conduit or pipe which is traced and heated to maintain the temperature of the grease therein at least about 80° C. The grease is then directed through a gear pump which is operated under high shear conditions from about 5,000 to as high as 20,000 revolutions per sec. The pipe exiting the gear pump directs the grease into a die which is positioned about the fiber optic cable in a manner such that the grease is extruded into the cable around the fibers. The grease is extruded into the cable at temperatures of about 500° to 600° F., preferably at about 550° F. Unlike prior art greases, the formulations of the invention are somewhat stable at that temperature.

When using the compositions as a flooding compound, similar procedures can be used, except that there is less concern of causing the fibers to move, since they are held within a sheath and the filling compound. As one of ordinary skill in the art would realize, the flooding compound would be used to surround the open area between the sheath and the outer jacket of the cable. Advantageously, the present compositions are useful as both the flooding and filling compounds without concern as to deterioration of any polypropylene components of the cable.

The compositions of the present invention are capable of passing the appropriate tests for obtaining suitable grease compositions for filling or flooding of fiber optic cable. These tests include a paper bleeding test utilizing a 0.1 millimeter penetrant at 25° C. This test is described as follows:

PROCEDURE

Prepare the following materials: 5 ml syringe; 11 cm diameter, type 1 filter paper; Pyrex watchglass (12 cm diameter); 600 ml Pyrex beaker; lab spatula; analytical balance; tweezers; scissors; and forced draft oven set to 80° C.

1. Load the grease compound into the syringe with a spatula. Slowly press the plunger to eliminate air bubbles.
2. Cut a 1 in by 1 in. filter paper square; weight (WT 1) and record (to 0.0001 grams).
3. Slowly apply 1 ml of the compound from the syringe onto the filter paper square in a circular dab. (Leave some room around the edges to allow the dab to spread.) Weigh this "sample square" and record this value as WT 2.
4. Weigh an 11 cm diameter filter paper circle (WT 3), and place it on the watchglass. Put the "sample square" on the center of the filter paper, and cover with a 600 ml beaker.
5. Let the sample lie undisturbed at room temperature for 16 hours.
6. Weigh the sample square (WT 2A) and the large filter paper circle (WT 3A).
7. Replace the sample square under the beaker, and place the entire assembly in the oven. Do not disturb for 24 hours.
8. Remove from the oven and allow to cool for 5 minutes on a marble surface. Weigh the sample square (WT 2B) and the filter paper circle (WT 3B). Note any color changes.
9. Discard sample square and filter paper.
10. When handling the sample square and the filter paper circle, use only tweezers. Take care to keep moisture and all foreign particles away from the sample square.

Results are calculated as follows:

CALCULATIONS

"A" values are used to calculate weight change after 16 hours at room temperature. "B" values are used to determine weight change after the additional 24 hours at 80° C.

1. Initial Weight=(WT 2)–(WT 1)
2. Weight Loss=(WT 2)–(WT 2A or WT 2B)
3. % Weight Loss=Weight Loss×100/Initial Weight
4. Filter Paper Weight Gain =(WT 3A or WT 3B)–(WT 3)
5. Volatile Weight
   a. (Weight Loss)–(Filter Paper Weight Gain) if >0 or
   b. 0, if (Weight Loss)–(Filter Paper Weight Gain) ≤0
6. % Volatile Weight=Volatile Weight ×100/Initial Weight
7. % Nonvolatile Separation=% Weight Loss–% Volatile Weight

MEASUREMENT ERROR

Due to repeated handling of the sample, some error should be expected, especially in calculating volatile weight loss at room temperature. All weights should be recorded to the nearest 0.0001 gram. All calculated results should be reported to the nearest whole number. At least three samples should be tested simultaneously per compound to be evaluated. The resulting percentage values can then be averaged to determine the % Weight Loss and % Nonvolatile Separation.

Values of less than about 15 are good and less than about 10 are exceptional.

Another measure of performance is a cone bleed test. This test is conducted as follows:

EQUIPMENT

1. Cone—Nickel screen—60 mesh with wire handle. The wire mesh cone is to have 3,600 holes per square inch, 0.0075 inch wire, openings of 0.011 inch. Manufactured by Newark Wire Cloth.
2. Beaker—250 ml glass.
3. Rod—Glass or other material to support mesh cone in beaker.
4. Oven—air, with variable temperature control (±1°C.)
5. Desiccator.
6. Balance—readability to 0.1 mg.
7. Spatula—metal, flat

PROCEDURE

1. Preheat oven to 80° C.
2. Weigh clean beaker on an analytical balance. Record the weight to the nearest mg. (Weight W1). Weigh the empty cone. Record the weight to the nearest mg. (Weight W2).
3. 
4. Using a spatula, place sample in cone so that the top of the grease is smooth and convex (to prevent trapping of oil on the top of the sample) and weigh. Record the weight to the nearest mg. (Weight W3).
5. Suspend cone on the glass rod within the beaker. Do not allow cone to touch the sides. 6. Weigh the entire assembly to the nearest mg. (Weight W4).
7. Place beaker and cone in oven set at 80° C.
8. At 30 hours, remove the cone-bleeding apparatus from the oven and place in a desiccator to cool to room temperature (about 1 hr.).
9. When cool, weigh the entire assembly (weight W5).
10. Gently tap cone against the inside of the beaker to remove any oil adhering to the top.
11. Weigh the beaker. Record the weight to the nearest mg. (Weight W6).
12. Calculate cone bleed and evaporation.

CALCULATIONS:

1. To calculate percent cone bleed use the following equation:

$$\% \text{ Cone bleed (oil separation)} = \frac{(W6 - W1)}{(W3 - W2)} * 100$$

where:
W6=weight of the beaker after the appropriate oven time
W1=original weight of the beaker
W3=original weight of the cone and sample
W2=weight of the cone 2. To calculate percent evaporation use the following equation:

$$\% \text{ Evaporation} = \frac{(W4 - W5)}{(W3 - W2)} * 100$$

Where:
W4=original weight of the cone, sample, rod and beaker
W5=weight of the cone, sample, rod and beaker after the appropriate time in the oven
W3=original weight of the cone and sample
W2=weight of the cone Values of less than about 3 are considered as representative of good grease formulations.

EXAMPLES

The scope of the invention is further described in connection with the following examples which are set forth for the sole purpose of illustrating the preferred embodiments of the invention and which are not to be construed as limiting the scope of the invention in any manner. In these Examples all parts given are by weight unless otherwise specified.

Examples 1–29

The formulations described in Table 1 were prepared by mixing the ingredients together under high shear as described above. Performance testing on these formulations can be found in Table 2. Although properties were note measured for the compositions of Examples 1–3, these were visually observed to produce good grease formulations. Testing of all properties of each grease was not completed, since modification of a previous formulation was made merely to study the change of a particular property, such as yield stress, paper bleed, etc., due to the modification.

TABLE 1

Formulations

| Component | Control A | Control B | 1 | 2 | 3 | 4 | 5 | 6 | 7 | 8 | 9 | 10 |
|---|---|---|---|---|---|---|---|---|---|---|---|---|
| Castor Oil | 90 | | 65.65 | 66.15 | 66.65 | 68 | 58 | 58 | 58 | 58.05 | 58.05 | 58.05 |
| VORITE 105 | | 93.05 | | | | | | | | | | |
| VORITE 125 | | | 25 | 25 | 25 | 25 | 35 | 35 | 35 | 35 | 35 | 35 |
| US 202 | 7 | | | | | | | | | | | |
| TS 720 | | 6 | 7.5 | 7 | 6.5 | 6 | 6 | 4 | 5 | 6 | 6 | 6 |
| PLX 959 | | | | | | | | | | 0.75 | 0.75 | 0.75 |
| TK 100 | | 0.2 | 0.05 | 0.05 | 0.05 | | | | 0.2 | 0.2 | 0.2 | 0.2 |
| L 150 | | | 1.8 | 1.8 | 1.8 | | | | | | | |
| V 854 | 3 | 0.75 | | | | 0.75 | 0.75 | 0.75 | 0.75 | | | |
| V 974 | | | | | | | | 2 | 1 | | | |

| Component | 11 | 12 | 13 | 14 | 15 | 16 | 17 | 18 | 19 | 20 | 21 | 22 |
|---|---|---|---|---|---|---|---|---|---|---|---|---|
| Castor Oil | 59 | 36.05 | 43 | 43 | 51.96 | 53.83 | 53.21 | 54.65 | 54.95 | 61.2 | 59.1 | 53.35 |
| VORITE 110 | | | 50 | | | | | | | | | |
| VORITE 115 | | | | 50 | | | | | | | | |
| VORITE 125 | 35 | 54.5 | | | 31.24 | 32.77 | 31.99 | 36.25 | 36.25 | 30 | 28.98 | 26.16 |
| TS720 | 5 | 8.5 | 6 | 6 | 6 | 7 | 8 | 8.5 | 8 | 8 | 6 | 4 |
| PX959 | | 0.9 | | | 0.75 | | | | | | 0.75 | 0.8 |
| TK 100 | | 0.05 | | | 0.05 | 0.05 | 0.05 | 0.05 | 0.05 | 0.2 | 0.05 | 0.05 |
| V 854 | 0.75 | | 0.75 | 0.75 | | 0.75 | 0.75 | 0.75 | 0.75 | 0.75 | | |
| DUALITE 6032AE | | | | | 5 | 5 | 5 | | | | 5.11 | 5.22 |
| SAB 800 HS | | | | | 5 | 1 | 1 | | | | | 10 |

| Component | 23 | 24 | 25 | 26 | 27 | 28 | 29 |
|---|---|---|---|---|---|---|---|
| Castor Oil | 58.2 | 55.48 | 57.48 | 57.75 | 58.45 | 57.45 | 58.45 |
| VORITE 110 | | | | | | | |
| VORITE 115 | | | | | | | |
| VORITE 125 | 35 | 27.72 | 28.72 | 28.45 | 28.75 | 28.75 | 28.75 |
| TS720 | 6 | 6 | 6 | 6 | 5 | 5 | 6 |
| PX959 | 0.75 | 0.75 | 0.75 | 0.75 | 0.75 | 0.75 | 0.75 |
| TK 100 | 0.05 | 0.05 | 0.05 | 0.05 | 0.05 | 0.05 | 0.05 |
| DUALITE 6032AE | | 5 | 5 | 7 | 7 | 6 | 5 |
| SAB 800 HS | | 5 | 2 | | | 1 | 1 |

NOTES FOR TABLE 1:
Castor Oil is AA Standard by CasChem, Inc.
VORITE 105 is a urethane adduct castor oil having a hydroxyl value of 130 and a viscosity of 26 stokes at 25° C.

TABLE 1-continued

Formulations

Component

VORITE 110 is a urethane adduct castor oil having a hydroxyl value of 102 and a viscosity of 115 stokes at 25° C.
VORITE 115 is a urethane adduct castor oil having a hydroxyl value of 93 and a viscosity of 192 stokes at 25° C.
VORITE 125 is a urethane adduct castor oil having a hydroxyl value of 72 and a viscosity of 900 stokes at 25° C.
US 202 is a colloidal silica from Degussa.
TS 720 is a colloidal silica from Cabot Corporation.
PLX 949 is an antioxidant of a blend of amine and phenolic compounds from Vanderbilt Chemicals.
TK 100 is a fungicide from Calgon Corporation.
L 150 is an amine based antioxidant from Ciba Geigy.
V 854 is an antioxidant of zinc, sulfur and phenolic compounds from Vanderbilt Chemicals.
V 974 is an antioxidant of metal and phenolic compounds from Vanderbilt Chemicals.
DUALITE 6032AE are glass microspheres from Pierce and Stevens.
SAB 800HS is a superabsorbant polymer from Stock Hausen Inc.

TABLE 2

Results

| Example | viscosity (cps) | paper bleed | cone bleed | other(s) |
|---|---|---|---|---|
| Control A | 9.4 | 27.9 | 4.75 | |
| Control B | 15.7 | 19.7 | 2.4 | |
| 4 | 19.6 | 12.2 | 1.8 | |
| 5 | 23.2 | 9.4 | 1.35 | OIT = 55 min<br>Yield Stress = 25 Pa |
| 6 | 24.1 | 11.8 | 0.3 | |
| 7 | 24.2 | 10.5 | 0.84 | Yield Stress = 17 Pa |
| 8 | 22.9 | 13.7 | 1.8 | Yield Stress = 43 Pa |
| 9 | 25.9 | 15.6 | 1.2 | |
| 10 | 28.6 | 10.3 | 1.4 | OIT = 67 min<br>Yield Stress = 28 Pa |
| 11 | 19.1 | 10.2 | 1.74 | |
| 12 | 49.1 | | 0.72 | |
| 13 | 15.5 | 17.5 | 2.2 | |
| 14 | 14.4 | 17.1 | 1.8 | |
| 15 | | | | Yield Stress = 39 Pa |
| 16 | | | | Yield Stress = 36 Pa |
| 17 | | | | Yield Stress = 51 Pa |
| 18 | | | 0.47 | Yield Stress = 71 Pa |
| 19 | | | 0.43 | Yield Stress = 52 Pa |
| 20 | | | 0.63 | OIT = 55 min<br>Yield Stress = 52 Pa |
| 21 | | 13.6 | 1.63 | Yield Stress = 34 Pa |
| 22 | | 16.4 | 1.87 | Yield Stress = 11 Pa |
| 23 | | 11.1 | 0.9 | |
| 24 | | | 0.5 | Yield Stress = 42 Pa |
| 25 | | | 0.7 | Yield Stress = 28 Pa |
| 26 | | | 0.8 | Yield Stress = 25 Pa |
| 27 | | | 2.5 | Yield Stress = 15 Pa |
| 28 | | | 1.3 | |
| 29 | | | 1.1 | Yield Stress = 27 Pa |

Regarding the Examples, Examples 5 and 10 have extremely good OIT values, while Examples 7, 22 and 27 have extremely low yield stress values. Example 12 has a very high viscosity, which is advantageous for certain applications. Examples 6, 7, 12, 18, 19, 20, 23, 24, 25, and 28 have the best cone bleed properties, while Examples 4–8, 10, 11, 21 and 23 have the best paper bleed properties. In this regard, Example 23 provides the best bleeding resistance.

These results show that it is possible to tailor the viscosity, bleed and Yield Stress values for a particular formulation depending upon the desired requirements. For example, for a filling compound, the lower yield stress compositions would be preferred. Viscosities of about 12 to 30,000 are eminently suitable for filling compounds, while higher viscosity compositions can be used as flooding compounds. Other requirements based upon a particular cable configuration or design may require different properties, which can be selected based upon the combinations of components illustrated above.

Example 30

A test for absorption of filling compounds by polypropylene was conducted using various cable greases, and the results are shown in Table 3 below. Samples of polypropylene and the grease were placed in contact and maintained at a temperature of 80° C. for the time periods noted, and the percent grease adsorbed by the polypropylene was determined.

TABLE 3

| Grease Composition or Type | Amount (%) absorbed after | | |
|---|---|---|---|
| | 1 week | 2 weeks | 3 weeks |
| Mineral Oil-Polybutene | 12.72 | 13.49 | 14.06 |
| Polyalpha olefin-Polybutene (Manufacturer A) | 7.58 | 8.64 | 9.19 |
| Polyalpha olefin-Polybutene (Manufacturer B) | 4.12 | 5.48 | 6.14 |
| Example 23 of Invention | 0.14 | 0.25 | 0.30 |

The data shows that the greases of the present invention are highly compatible with polypropylene compared to conventional formulations.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A cable filling material of a grease composition comprising:
   (a) about 25 to 75 parts by weight of an oil component selected from the group consisting of castor oil and a ricinoleate polyol;
   (b) about 13 to 71 parts by weight of a hydroxy-terminated polymer selected from the group consisting of (A) polymerized castor oil, (B) the reaction product of a polyisocyanate compound and castor oil, and (C) the reaction product of a polyisocyanate compound and a ricinoleate polyol; and
   (c) about 4 to 12 parts by weight of inorganic colloidal particles which are present to impart a gel structure to the composition when mixed therewith.

2. The composition of claim 1 wherein the colloidal particles are selected from the group consisting of hydrophobic fumed silica, precipitated silica, clay, and mixtures thereof.

3. The composition of claim 1 wherein the colloidal particles are present in an amount of about 5–10 parts by weight.

4. The composition of claim 1 wherein the oil is present in an amount of about 40 to 70 parts by weight and the hydroxy-terminated polymer is present in an amount of about 20 to 50 parts by weight.

5. The composition of claim 1 wherein the oil is castor oil.

6. The composition of claim 1 wherein the hydroxy-terminated polymer is the reaction product of a polyisocyanate compound and castor oil having a hydroxyl value of at least 70 and a viscosity of at least 26 stokes at 25° C.

7. The composition of claim 6 wherein the oil is castor oil and is present in an amount of about 50 to 60 parts by weight, the hydroxy-terminated polymer is the reaction product of a polyisocyanate compound and castor oil and is present in an amount of about 30 to 40 parts by weight, and the colloidal particles are silica, clay or mixtures thereof and are present in an amount of about 6 to 8 parts by weight.

8. The composition of claim 1 further comprising a bleed inhibitor in an amount of about 1 up to about 5 parts by weight.

9. The composition of claim 8 wherein the bleed inhibitor is present in the amount of between about 1 and 4 parts by weight and is selected from the group consisting of a polyurethane elastomer, a polyester elastomer, butadiene acrylonitrile, polyacrylate, a copolymer of an acrylate, a chlorinated rubber, and a rubber block copolymer.

10. The composition of claim 1 further comprising an antioxidant in an amount of between about 0.1 and 2 parts by weight.

11. The composition of claim 1 which further comprises a water blocking agent in an amount of about 1 to about 10 parts by weight.

12. The composition of claim 11 wherein the water blocking agent is a superabsorbent polymer and is present in an amount of about 1 to 5 parts by weight.

13. The composition of claim 1 which further comprises hollow microspheres in an amount of about 1 up to about 10 parts by weight.

14. The composition of claim 13 wherein the microspheres are made of a material selected from the group consisting of glass, ceramic, plastic and mixtures thereof and are present in an amount of about 1 to 5 parts by weight.

15. A coaxial cable comprising one or more optical fibers, and a sheath surrounding the fiber and filled with the composition of claim 1.

* * * * *